United States Patent [19]

Birkenbach et al.

[11] 4,374,551

[45] Feb. 22, 1983

[54] MECHANICAL ACTUATING DEVICE FOR A SPOT-TYPE DISC BRAKE

[75] Inventors: Alfred Birkenbach, Hattersheim; Helmut Franke, Wehrheim, both of Fed. Rep. of Germany

[73] Assignee: ITT Industries, Inc., New York, N.Y.

[21] Appl. No.: 201,941

[22] Filed: Oct. 29, 1980

[30] Foreign Application Priority Data

Nov. 20, 1979 [DE] Fed. Rep. of Germany ....... 2946854

[51] Int. Cl.³ ..................... F16D 65/16; F16D 65/52
[52] U.S. Cl. ................................. 188/71.9; 188/72.8
[58] Field of Search ............. 188/71.9, 71.8, 196 BA, 188/196 B, 196 R, 72.8, 72.9, 73.32, 74.5 R, 71.7, 79.5 GE, 216, 71.2, 72.3; 192/111 A

[56] References Cited

U.S. PATENT DOCUMENTS

| 3,768,602 | 10/1973 | Burnett | 188/71.9 |
| 3,952,844 | 4/1976 | Newstead et al. | 188/72.8 |
| 4,014,411 | 3/1977 | Troester | 188/72.8 X |

FOREIGN PATENT DOCUMENTS

| 1425367 | 9/1969 | Fed. Rep. of Germany | 188/72.8 |
| 1575996 | 7/1970 | Fed. Rep. of Germany | . |
| 2063399 | 6/1981 | United Kingdom | 188/71.9 |

Primary Examiner—Douglas C. Butler
Attorney, Agent, or Firm—John T. O'Halloran; Alfred C. Hill

[57] ABSTRACT

The brake actuating device is disposed in a cylindrical bore of a disc brake caliper leg and comprises an actuating spindle and an actuating nut interconnected by a ball bearing thread. The actuating spindle has a central bore receiving an adjusting spindle surrounded by a sleeve, one end of which is connected to an adjusting nut threaded onto the adjusting spindle and transmitting the actuating force thereon. The other end of the sleeve is accessible through a bore from the outside of the caliper leg and can be turned with a tool in order to reset the adjusting nut for replacement of the worn brake pads.

17 Claims, 3 Drawing Figures

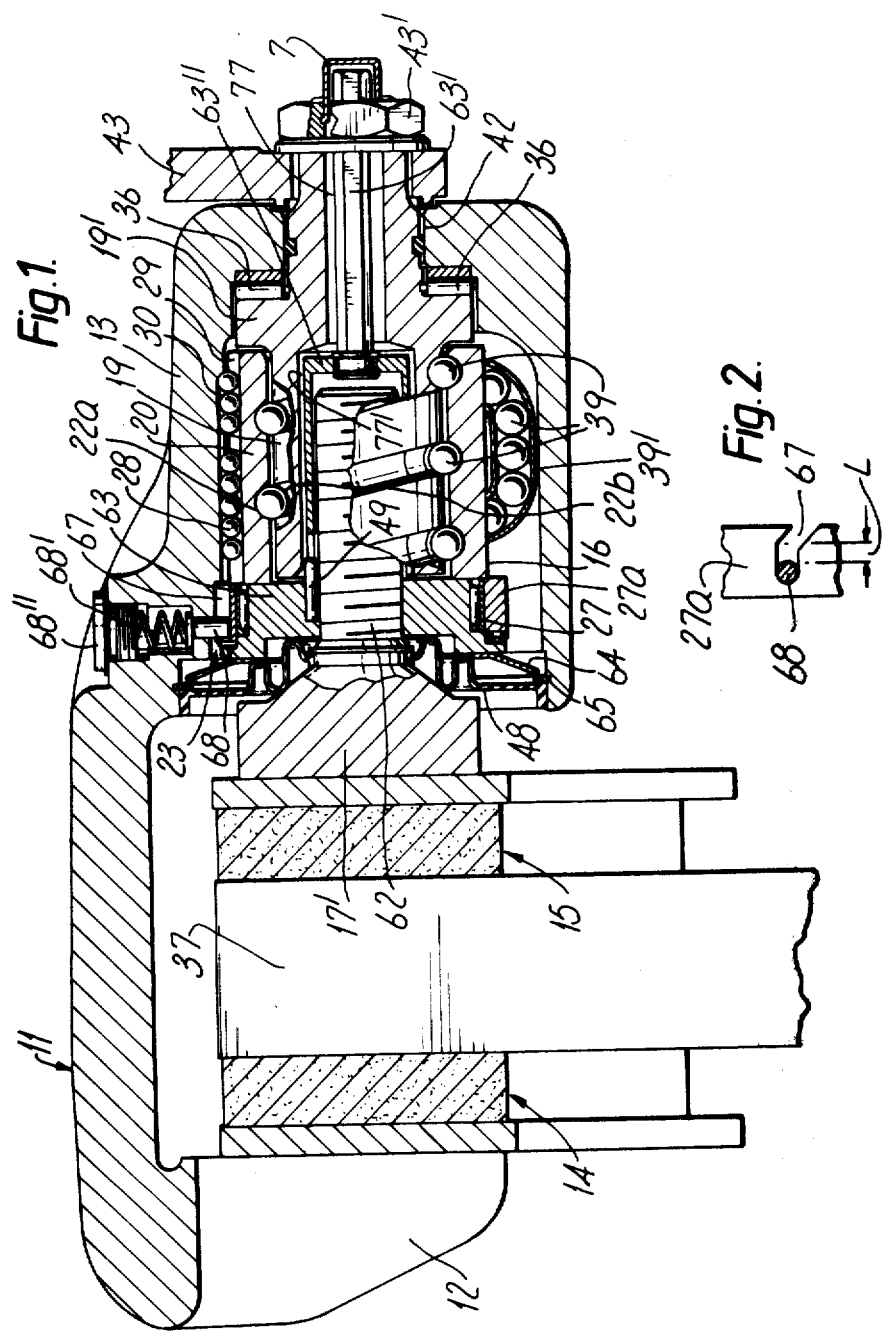

MECHANICAL ACTUATING DEVICE FOR A SPOT-TYPE DISC BRAKE

BACKGROUND OF THE INVENTION

The present invention relates to a mechanical brake actuating device for spot-type disc brakes comprising a brake caliper embracing the brake disc inwardly or outwardly, at least one leg of the brake caliper having a cavity, preferably an axial, cylindrical bore, an actuating spindle axially disposed in the cavity, and cooperating with an actuating nut disposed in the cavity in such a manner that a brake shoe applying member is advanced in the event of an axial relative displacement between the spindle and the nut caused by means of a relative rotation between the actuating spindle and the actuating nut due to an actuating means, and an automatic adjusting device for the brake shoe applying member disposed in the cavity.

In a known spot-type disc brake adapted to be actuated both hydraulically and mechanically, for instance German Patent DE-AS No. 1,575,996, a brake piston is located axially freely movable on the actuating nut and for being actuated is acted upon from the inside by an adjusting spindle cooperating with the adjusting device. In this known spot-type disc brake, it is required for the resetting of the adjusting device, after a brake pad replacement, to unscrew a screw cap and to take out a wedge. This method not only involves intricate work, but also bears the risk of losing the unscrewed parts. Besides, the wedge may be jammed by corrosion, so that it cannot be removed without difficulties during pad replacement.

SUMMARY OF THE INVENTION

An object of the present invention is to provide a spot-type disc brake, in particular a fist-type caliper brake of the type referred to hereinabove, in which the resetting of the adjusting device during pad replacement is allowed to take place simply by application of a tool without the necessity of disassembling any parts. Moreover, the brake is constructed very compactly and does not comprise too many components. In addition to this, the mechanical efficiency of the actuating device is the maximum possible one.

A feature of the present invention is the provision of a mechanical actuating device for a spot-type disc brake comprising a brake caliper embracing a brake disc having a cylindrical bore disposed in one leg thereof, the bore having a longitudinal axis parallel to an axis of rotation of the brake disc; an actuating spindle disposed in the bore coaxial of the longitudinal axis; an actuating nut disposed in the bore coaxial of the longitudinal axis cooperating with the actuating spindle in a manner to advance a brake shoe actuating member when an axial relative displacement between the actuating spindle and the actuating nut occurs due to a relative rotation between the actuating spindle and the actuating nut caused by an actuating means connected to one of the actuating spindle and the actuating nut; and an automatic brake pad clearance adjusting device disposed in the bore coaxial of the longitudinal axis including an adjusting spindle disposed coaxial of the longitudinal axis connected to and extending away from a surface of the brake shoe actuating member remote from the brake disc, the adjusting spindle and the brake shoe actuating member being locked to each other to prevent rotational movement thereof, an adjusting nut disposed coaxial of the longitudinal axis threaded on the adjusting spindle and accessible from the outside of the one leg remote from the brake disc for turning thereof during brake pad replacement, and a clutch device disposed coaxial of the longitudinal axis associated with the adjusting nut to cause the adjusting spindle to execute a rotary motion advancing the adjusting spindle toward the brake disc, the clutch device becoming effective during a brake application when a nominal brake pad clearance is exceeded; the actuating nut and the actuating spindle transmitting their relative axial displacement to the adjusting nut.

In an advantageous construction, the adjusting nut and the adjusting spindle are subjected to the force of a spring in the brake release direction. The spring is preferably a cup spring acting between the caliper and the adjusting nut. The cup spring serves as a return spring and as a friction coupling for the adjusting nut, thus, preventing coincidental displacements caused by vibrations, for example.

For realization of the adjustment of the brake pad clearance, a one-way clutch is located preferably between the adjusting nut and the caliper, the one-way clutch being a component of the clutch device. In a particularly favorable embodiment, the drive is effected in that the driven part of the one-way clutch includes an axial inclined groove which is engaged by a radial pin fastened to the housing.

In one embodiment, in which the actuating spindle is adapted to be turned around its axis by the actuating means, the actuating spindle bears through axial bearings against the caliper and the actuating nut encompassing the spindle is located in the cavity locked against rotational movement but axially movable, with the adjusting spindle extending into an axial cavity of the actuating spindle.

A practical realization of the resetting of the adjusting nut is characterized in that a rotary actuating member for the adjusting nut extends from the adjusting nut through an axial bore and, if necessary, through an axial cavity of the adjusting spindle. For this, the rotary actuating member preferably includes a turn sleeve encompassing the adjusting spindle and being in engagement with the adjusting nut locked against rotational movement but axially movable, and a turn rod locked against rotational movement connected to the turn sleeve.

A further embodiment, in which the actuating nut is adapted to be turned around its axis by the actuating means, is constructed such that the actuating nut bears through axial bearings against the caliper and that the actuating spindle encompassed by the actuating nut is located in the cavity locked against rotational movement but axially movable.

In this embodiment, the actuating spindle including an axial cavity suitably acts on a collar of the adjusting nut via an inner annular step. The adjusting nut may in this case be accessible from the outside through the cavity of the actuating spindle and through the actuating nut. The adjusting nut incorporates preferably a hexagonal opening for application of a turning tool to its portion projecting axially beyond the adjusting spindle.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross sectional view of a first embodiment of a fist-type caliper brake in accordance with the principles of the present invention having an actuating spindle driven by the actuating means;

FIG. 2 is a partial view of the ring of the one-way clutch in the area of the axial inclined groove of the embodiments of FIGS. 1 and 3;

DESCRIPTION OF THE PREFERRED EMBODIMENTS

Figure 3:
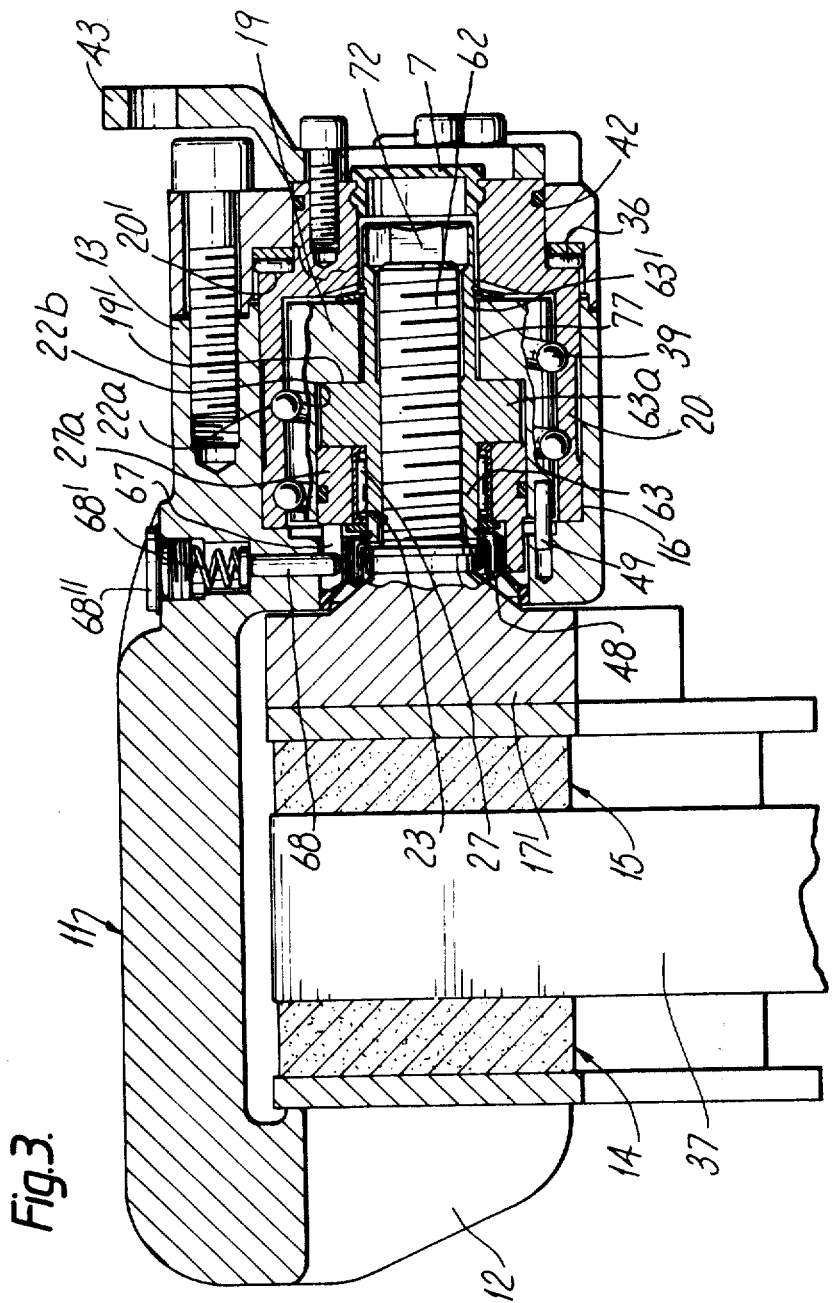
FIG. 3 is a longitudinal cross sectional view of a second embodiment of a fist-type caliper brake in accordance with the principles of the present invention having the actuating nut turned by an outer actuating means.

Referring to FIG. 1, a fist-type caliper 11 embraces the outer periphery of a brake disc 37. Leg 12 situated at the outboard side of disc 37 carries brake shoe 14 which is actuated indirectly by caliper 11. The inboard leg 13 of fist-type caliper 11 accommodates an axial bore 16, in which an actuating nut 20 is located axially movably but not rotatably. Actuating nut 20 includes on its outer periphery an axial groove 29 aligned with a groove 30 in leg 13 provided in the inner surface of bore 16. In the cavity formed by the two grooves 29 and 30 and closed on all sides, a row of balls 28 is disposed permitting an axial displacement of actuating nut 20 within leg 13 while at the same time inhibiting a rotary motion of actuating nut 20 relative to leg 13.

In its inner surface, actuating nut 20 includes a ball bearing thread 22a, in which the circulating balls 39 are located, which are returned at the outside in the position designated by reference numeral 39'. Balls 39 engage a ball bearing thread 22b disposed in the outer surface of an actuating spindle 19 which extends outwardly through a bore 42 in the closed end of bore 16 of leg 13. The end of actuating spindle 19 extending out of leg 13 is non-rotatably secured to actuating means 43 by means of a lock nut 43' screwed to a threaded journal of actuating spindle 19.

Actuating spindle 19 carries a radially projecting collar 19' between that portion thereof penetrating bore 42 and that portion thereof having ball bearing thread 22b. Through collar 19' spindle 19 bears through needle bearings 36 axially against the area of leg 13 surrounding bore 42. Brake forces are transmitted to caliper 11 at this location. In accordance with the present invention, collar 19' extends radially approximately up to the outer periphery of actuating nut 20.

Actuating spindle 19, in the rest position shown in FIG. 1, extends radially in the direction of brake disc 37 up to just short of the end surface of actuating nut 20 adjacent to brake disc 37. This end surface of actuating nut 20 acts on an adjusting nut 63, which is located coaxially of actuating spindle 19 and actuating nut 20 and engaged in an adjusting thread on an adjusting spindle 62 likewise located coaxially thereof. Adjusting spindle 62 extends into an axial cavity 77' of actuating spindle 19 spaced considerably from the inner surface of cavity 77'. Axial cavity 77' extends approximately over the axial length of ball bearing thread 22b. Adjusting spindle 62 includes on the end thereof adjacent brake disc 37 a pressure plate 17' acting as a brake applying member. Pressure plate 17' is connected to adjusting spindle 62 in a manner that locks it against rotational movement and axially immovably and acts on brake shoe 15 directly. An annular sealing diaphragm 48 is placed between leg 13 of caliper 11 and adjusting nut 62.

Provided as a clutch device 23 at the outer periphery of adjusting nut 63 is a one-way clutch 27 having an outer ring 27a which is turnable only in one direction and includes an axially inclined groove 67, a topview of which is illustrated in FIG. 2. A radial pin 68 disposed in leg 13 engages in axially inclined groove 67, pin 68 being subjected to the force of a spring 68' in the direction of axially inclined groove 67. Pin 68, together with spring 68', can be inserted subsequently in leg 13 by means of a screw cap 68", which is important for the assembly of the brake. It is also possible to use instead of axially inclined groove 67 an inclined through-groove of an increased width corresponding to the brake pad clearance L.

A cylindrical actuating sleeve 63" is additionally housed in cavity 77' between adjusting spindle 62 and actuating spindle 19. Sleeve 63" encompasses adjusting spindle 62 on all sides and is in engagement with a driving pin 49 extending axially from adjusting nut 63 in such a manner that actuating sleeve 63" turns with adjusting nut 63 while being axially immovable relative thereto.

Extending outwardly from the bottom of actuating sleeve 63" through an axial bore 77 of actuating spindle 19 is an actuating rod 63' which projects outwardly beyond lock nut 43' and is covered by a plastic cap 7.

A cup spring 64 extends between a fastening ring 65 fixed in leg 13 at the adjacent end portion of bore 16 and adjusting nut 63. Cup spring 64 provides the restoring force for pressure plate 17'. Due to an appropriate preload of cup spring 64, plate 17' abuts adjusting nut 63 with friction. As a result, adjusting nut 63 is secured against being accidently turned on account of vibrations.

The usual application of the brake takes place as follows. When actuating means 43 swivels counterclockwise, actuating nut 20 will be displaced in the axial direction thereby moving pressure plate 17' in the direction of brake disc 37 via adjusting nut 63 and adjusting spindle 62. As a result, the brake force is transmitted to the brake pads. During such a clamping or braking movement, radial pin 68 moves within the straight portion of axial inclined groove 67, which portion is designated with reference numeral L in FIG. 2. Thus, the brake pad clearance is defined. As soon as pin 68 exceeds the brake pad clearance L during a clamping movement due to the brake pads being worn, pin 68 will slide on the inclined portion of groove 67, whereby movable ring 27a of one-way clutch 27 is turned accordingly.

Upon release of the brake, pin 68 slides back on the inclined portion of groove 67. However, since ring 27a is now no longer able to be turned relative to adjusting nut 63 due to the effect of one-way clutch 27, nut 63 is entrained to a rotary motion corresponding to that of ring 27a during braking operation. Adjusting spindle 62 is screwed a little distance out of adjusting nut 63 via the adjusting thread disposed between adjusting nut 63 and adjusting spindle 62. Thus, an adjusting step has been made. The adjustment is continued during each braking operation until pin 68 will again move only within the range of clearance L shown in FIG. 2 during a braking operation. With each adjustment, adjusting spindle 62 is screwed a little distance out of adjusting nut 63.

If the adjusting device is to be reset to its initial position after the brake pads are totally worn out, cap 7 will be simply loosened and a turning tool will be applied to the hexagonal end portion of actuating rod 63'. Rod 63' is now turned opposite compared to an adjusting step, so that adjusting spindle 62 is screwed down in the cavity of actuating sleeve 63" until the initial position is again reached.

In the embodiment according to FIG. 3 like reference numerals are assigned like parts as in the embodiment of FIG. 1.

In contrast to FIG. 1, actuating spindle 19 and actuating nut 20 have changed parts as illustrated in FIG. 3. The actuating means 43 is accordingly affixed to actuating nut 20 projecting outwardly through bore 42. Actuating nut 20 bears axially against the end of bore 16 of leg 13 via an annular step 20' and needle bearings 36.

Actuating nut 20 houses in its hollow interior actuating spindle 19. Nut 20 is connected to spindle 19 through ball bearing threads 22a and 22b and balls 39. In this embodiment the ball return tube is situated at the outside.

Actuating spindle 19 has in its interior a stepped bore 77, in which adjusting nut 63 is located. For transmitting the brake force from actuating spindle 19 to adjusting nut 63, nut 63 carries a collar 63a projecting radially and cooperating with step 19' of stepped bore 77 of actuating spindle 19.

The one-way clutch 27 and its outer movable ring 27a are located in this embodiment in an axial alignment with collar 63a at the end surface thereof adjacent brake disc 37.

Adjusting nut 63 includes a sleeve-like extension 63' extending away from brake disc 37, the end of extension 63' including a hexagonal recess 72. Hexagonal recess 72 is accessible from the outside through the inner bore of actuating spindle 19 after removal of plastic cap 7.

Adjusting spindle 62 extends from pressure plate 17' into the inside of adjusting nut 63 and reaches in the initial position illustrated in FIG. 3 up to the end of sleeve-like extension 63' provided with hexagonal recess 72.

In the embodiment according to FIG. 3, the adjusting steps are performed in the same way as in the previously described embodiment. After the brake pads are worn out, adjusting spindle 62 can be screwed into adjusting nut 63 to achieve the initial position shown in FIG. 3 by removing cap 7, inserting an appropriate turning tool into the hexagonal recess 72 and turning adjusting nut 63.

It should be pointed out that, apart from the brake pad clearance, distance L also has to take into consideration the maximum extension of the caliper's housing during a brake application.

While we have described above the principles of our invention in connection with specific apparatus, it is to be clearly understood that this description is made only by way of example and not as a limitation to the scope of our invention as set forth in the objects thereof and in the accompanying claims.

We claim:

1. A mechanical actuating device for a spot-type disc brake comprising:
a brake caliper embracing a brake disc having a cylindrical bore disposed in one leg thereof, said bore having a longitudinal axis parallel to an axis of rotation of said brake disc;
an actuating spindle disposed in said bore coaxial of said longitudinal axis;
an actuating nut disposed in said bore coaxial of said longitudinal axis cooperating with said actuating spindle in a manner to advance a brake shoe actuating member when an axial relative displacement between said actuating spindle and said actuating nut occurs due to a relative rotation between said actuating spindle and said actuating nut caused by an actuating means connected to one of said actuating spindle and said actuating nut; and
an automatic brake pad clearance adjusting device disposed in said bore coaxial of said longitudinal axis including
an adjusting spindle disposed coaxial of said longitudinal axis connected to and extending away from a surface of said brake shoe actuating member remote from said brake disc, said adjusting spindle and said brake shoe actuating member being locked to each other to prevent rotational movement thereof,
an adjusting nut disposed coaxial of said longitudinal axis threaded on said adjusting spindle and accessible from the outside of said one leg remote from said brake disc for turning thereof during brake pad replacement, and
a clutch device disposed coaxial of said longitudinal axis associated with said adjusting nut to cause said adjusting spindle to execute a rotary motion advancing said adjusting spindle toward said brake disc, said clutch device becoming effective during a brake application when a nominal brake pad clearance is exceeded;
said actuating nut and said actuating spindle transmitting their relative axial displacement to said adjusting nut;
said adjusting nut and said adjusting spindle are subjected to the force of a spring in a brake release direction; and
said spring is a cup spring acting between said leg and said adjusting nut.

2. An actuating device according to claim 1, wherein said clutch device includes a one-way clutch disposed between said adjusting nut and the inner surface of said bore.

3. An actuating device according to claim 2, wherein said one-way clutch includes a driven portion having an axially inclined groove engaged by a radial pin extending through a wall of said leg into said bore.

4. An actuating device according to claim 3, wherein said actuating spindle has one end thereof remote from said brake disc bearing against the inner wall of a closed end of said bore remote from said brake disc through bearings, said actuating spindle having an axial cavity coaxial of said longitudinal axis, said actuating nut encircles said actuating spindle and is locked against rotational movement but axially movable in said bore, and
said adjusting spindle extends into said axial cavity, said actuating spindle being connected to said actuating means for rotation thereof about said longitudinal axis.

5. An actuating device according to claim 4, further including
an actuating member for said adjusting nut extending from said adjusting nut through said axial cavity and an axial opening in said closed end of said bore.

6. An actuating device according to claim 5, wherein said actuating member includes a sleeve encircling said adjusting spindle havng one end thereof connected to said adjusting nut, said sleeve and said adjusting nut being locked to each other against rotational movement but axially movable and a rod connected to the other end of said sleeve locked against rotational movement extending through said axial opening.

7. An actuating device according to claim 1, wherein said actuating nut has one end thereof remote from said brake disc bearing against the inner wall of a closed end of said bore remote from said brake disc through bearings, and said actuating spindle is encircled by said actuating nut and is locked in said bore against rotational movement but axially movable.

8. An actuating device according to claim 7, wherein said actuating spindle includes an axial stepped bore having an inner annular step acting on a radially extending collar of said adjusting nut, said adjusting nut being disposed between said adjusting spindle and said actuating spindle.

9. An actuating device according to claims 7 or 8, wherein said adjusting nut is accessible from the outside through an axial opening in said closed end of said bore and said actuating nut.

10. An actuating device according to claim 9, wherein said adjusting nut includes a sleeve-like extension extending toward said closed end of said bore having a hexagonal opening in that portion thereof extending beyond said adjusting spindle to receive a turning tool.

11. An actuating device according to claims 7 or 8, wherein said clutch device includes a one-way clutch disposed between said adjusting nut and the inner surface of said bore.

12. An actuating device according to claim 11, wherein said one-way clutch includes a driven portion having an axially inclined groove engaged by a radial pin extending through a wall of said leg into said bore.

13. An actuating device according to claim 1, wherein said actuating spindle has one end thereof remote from said brake disc bearing against the inner wall of a closed end of said bore remote from said brake disc through bearings, said actuating spindle having an axial cavity coaxial of said longitudinal axis, said actuating nut encircles said actuating spindle and is locked against rotational movement but axially movable in said bore, and said adjusting spindle extends into said axial cavity, said actuating spindle being connected to said actuating means for rotation thereof about said longitudinal axis.

14. An actuating device according to claim 13, further including an actuating member for said adjusting nut extending from said adjusting nut through said axial cavity and an axial opening in said closed end of said bore.

15. An actuating device according to claim 14, wherein said actuating member includes a sleeve encircling said adjusting spindle having one end thereof connected to said adjusting nut, said sleeve and said adjusting nut being locked to each other against rotational movement but axially movable and a rod connected to the other end of said sleeve locked against rotational movement extending through said axial opening.

16. An actuating device according to claims 13, 14 or 15, wherein said clutch device includes a one-way clutch disposed between said adjusting nut and the inner surface of said bore.

17. An actuating device according to claim 16, wherein said one-way clutch includes a driven portion having an axially inclined groove engaged by a radial pin extending through a wall of said leg into said bore.

* * * * *